United States Patent [19]
Fisher et al.

[11] 3,850,596
[45] Nov. 26, 1974

[54] GAS-SOLIDS SEPARATOR WITH ACCESS PLATFORM

[75] Inventors: Ervin Fisher, Berea, Ohio; Frederick O. Olson, Whitehall, Pa.

[73] Assignee: Fuller Company, Catasauqua, Pa.

[22] Filed: Sept. 13, 1972

[21] Appl. No.: 288,626

[52] U.S. Cl. .................. 55/341, 182/83, 182/222
[51] Int. Cl. .................................................. B01d 46/02
[58] Field of Search ........ 55/341, 342, 305; 182/82, 182/142, 222, 227, 83, 87

[56] References Cited
UNITED STATES PATENTS

| | | | |
|---|---|---|---|
| 2,918,985 | 12/1959 | Rissuto | 182/223 |
| 3,057,137 | 10/1962 | Perlis et al. | 55/341 |
| 3,266,225 | 8/1966 | Barr | 55/341 |
| 3,372,534 | 3/1968 | Hysinger et al. | 55/341 |
| 3,491,518 | 1/1970 | Williams | 55/341 |

*Primary Examiner*—Frank W. Lutter
*Assistant Examiner*—David L. Lacey
*Attorney, Agent, or Firm*—Frank H. Thomson

[57] ABSTRACT

A gas-solids separator generally known as a baghouse which employs elongated fabric filter elements mounted in a housing with each filter element flow connected to an opening in a tube sheet. Gas to be filtered enters the housing below the tube sheet and passes through the openings in the tube sheet and the filter elements. Particles of dust are collected on the filter elements and cleaned gas is exhausted from the area above the tube sheet. The filter elements are grouped to define walkways along the tube sheet to permit access to the lower portion of each of the filter elements. An elevated platform is mounted in the housing to permit access to the upper end of the filter elements. The horizontal width of the platform can be increased to permit its use by a maintenance man and decreased when the separator is filtering gas so that the filter bags do not contact the platform. This platform can be pivoted about its own longitudinal axis between a position which permits its use by a maintenance man and a position which prevents contact between the platform and the filter elements. A guard rail is provided on the platform.

9 Claims, 8 Drawing Figures

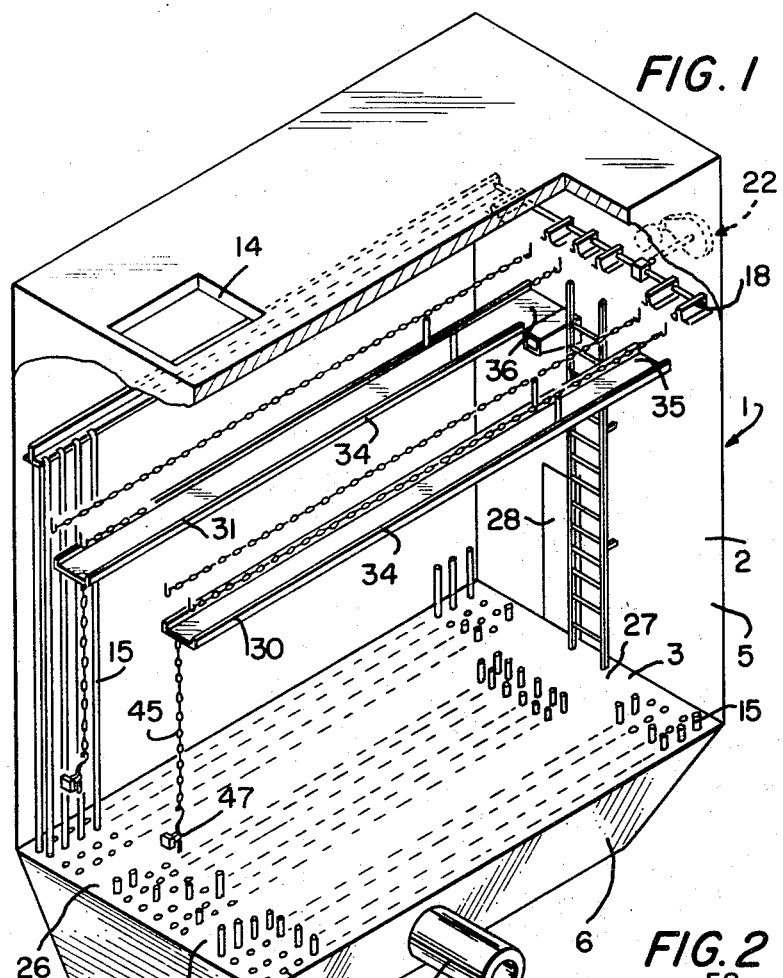
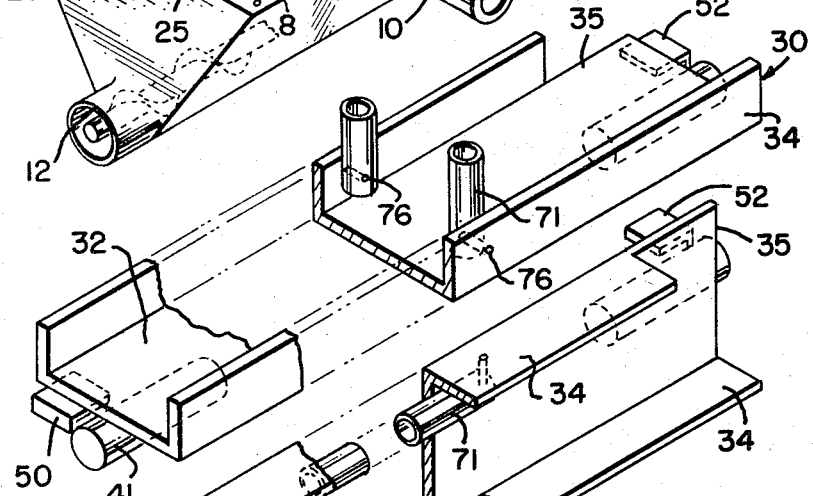
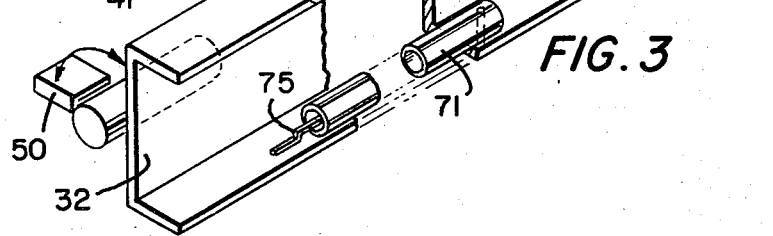
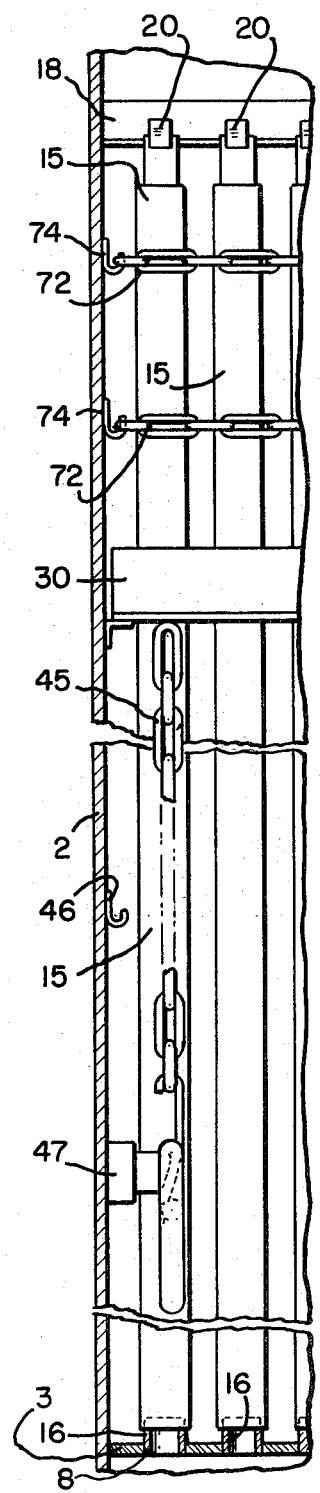

GAS-SOLIDS SEPARATOR WITH ACCESS PLATFORM

BACKGROUND OF THE INVENTION

This invention relates to gas-solids separators and in particular to a gas-solids separator commonly known as a baghouse which can be factory assembled and shipped as a unit to the site where it is to be used Gas-solids separators employing fabric filter elements in the form of elongated, generally vertically extending tubular members are well known in the dust control art. It is conventional practice to divide the housing of the baghouse into upper and lower chambers by means of a tube sheet having a plurality of openings therein. A bag or filter element is flow connected to each of the openings in the tube sheet so that communication between the upper and lower chambers is solely through the openings and the filter element. The other end of the filter element is suitably secured. Gas to be cleaned enters one of the chambers passes through the filter elements, and particulates in the gases are collected on the filter elements. The cleaned gas passes through the filter elements to the other chamber and is exhausted to atmosphere. Some means is provided for cleaning the filter elements by removing the particulates collected thereon. This cleaning means may be in the form of reverse air cleaning, a shaker mechanism, a sonic generator of a pulse of high pressure air.

The trend in manufacturing baghouses is toward factory-assembled units. With such units, the baghouse is completely factory constructed, including the installation of the bags, and shipped to the job site as a unit. Factory-assembled units have the advantage of substantially reducing expensive field erection costs. It is the desired of manufacturers to construct as large a factory-assembled unit as can be shipped by conventional means without special transportation requirements and without field erection. In this instance, size is measured by the amount of filter cloth area which can be incorporated into a particular unit.

In achieving maximum filter cloth area in a given volume of housing, the length and the diameter of the bags must be taken into consideration as well as the spacing between individual filter bags. The given volume of the housing is limited by the size of the housing which can be economically shipped.

As a normal maintenance factor, it is necessary during the life of a baghouse to change individual filter bags as they become worn or fail for various reasons. Because of this necessity to change filter bags, some arrangements must be provided to permit maintenance personnel to gain access to the filter bags and in particular to the means for securing the filter bags to the tube sheet and the means for supporting the other end of the filter bags.

For ease of maintenance, it is desirable that the maintenance person be able to get as close to each filter bag as possible. In order to permit easy access to the filter bags, it is desirable to provide aisles or walkways along the tube sheet to permit access to the means for securing the filter bags to the tube sheet. It is preferable to space or group the filter bags so that a maintenance person does not have to reach too far to gain access to any particular filter bag.

In many filtering apparatus, the filter elements are connected at the top of a shaker mechanism or some other means for supporting the top of the bag. In order to change filter bags, it is necessary to have access to this top supporting structure, as well as the connection at the tube sheet. Prior to the present invention, it was known to provide walkways or elevated platforms to permit access to this top supporting structure. With modular construction and the desire to place as many filter bags as possible in a given fixed volume, the use of conventional fixed platforms is not practical. The impracticality is a result of the fact that the walkways or platforms must be of a minimum width in order to provide a convenient and efficient work area for a person doing maintenance work. The filter element cannot be allowed to rub against the platform during cleaning operations. Such rubbing contact will result in early failure of the filter bags. Therefore, with conventional fixed platforms, if the volume of the dust collector is to remain constant, which it must in a factory-assembled unit, the number of filter bags must be reduced.

In order to overcome the minimum width requirements of the platform, the upper walkway can be eliminated. If this is done, maintenance personnel will be required to use portable ladders to gain access to the upper support elements of the filter bags. Working from portable ladders is difficult and time consuming. In addition, the use of portable ladders can cause damage to some types of filter bags which are made of fragile fabric such as filter bags made from glass fibers. This hazard can result in the requirement that most of the filter bags be removed from the area where work is being done with the portable ladders.

SUMMARY

It is, therefore, the principal object of this invention to provide a gas-solids separator particularly designed for factory assembly.

It is another object of this invention to provide a gas-solids separator which permits a maximum cloth area in a given volume while permitting easy access to the filter elements for maintenance purposes.

It is a still further object of this invention to provide a gas-solids separator which includes an elevated platform permitting access to the top of the filter elements, which platform conforms to safety requirements without reducing the number of filter bags in the collector.

In general, the foregoing and other objects will be carried out by providing a gas-solids separator comprising: a housing; a tube sheet dividing said housing into an upper chamber and a lower chamber and having a plurality of openings therethrough; a plurality of elongated, generally vertically extending filter elements mounted in said upper chamber; the lower end of each filter flow connected to one of the openings in said tube sheet whereby the sole communication between said lower chamber and said upper chamber is through said openings and said filter elements; means for supporting the upper end of said filter elements; said openings in said tube sheet and said filter elements being grouped to define at least one walkway along said tube sheet to permit access to the lower end of said filter elements; means for permitting access to the upper end of said filter elements including at least one platform means mounted in said housing above said tube sheet and means for increasing the horizontal width of said platform means when it is desired to gain access to the upper end of said filter elements.

BRIEF DESCRIPTION OF THE DRAWINGS

The invention will be described in connection with the annexed drawings wherein:

FIG. 1 is a perspective view of a gas-solids separator in accordance with the present invention;

FIG. 2 is a perspective view of a platform in accordance with the present invention;

FIG. 3 is a perspective view of the platform of FIG. 2 in a different position;

FIG. 7 is a sectional view of a portion of the filtering apparatus of the present invention.

DESCRIPTION OF THE PREFERRED EMBODIMENT

Figure 4:
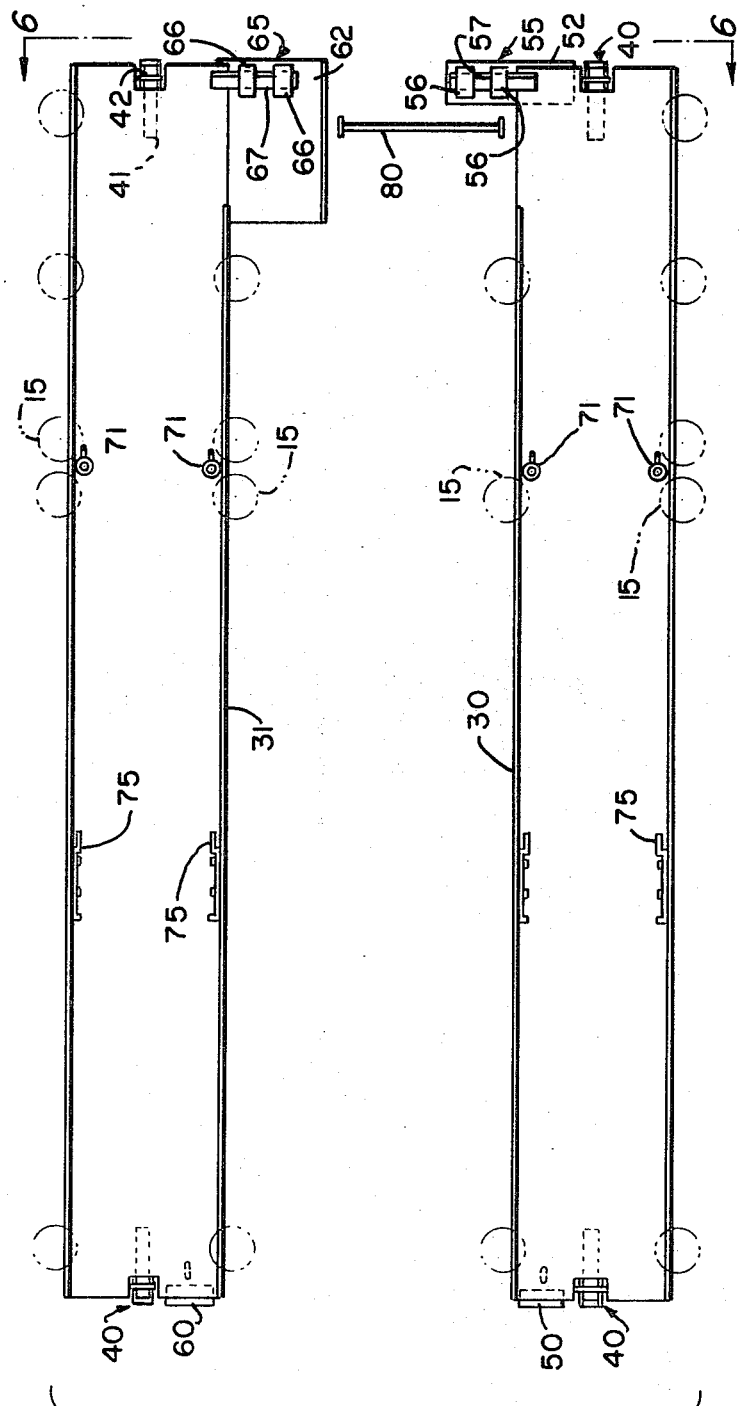
FIG. 4 is a top plan view of a pair of walkways employed by the filtering apparatus of the present invention.
Figure 5:
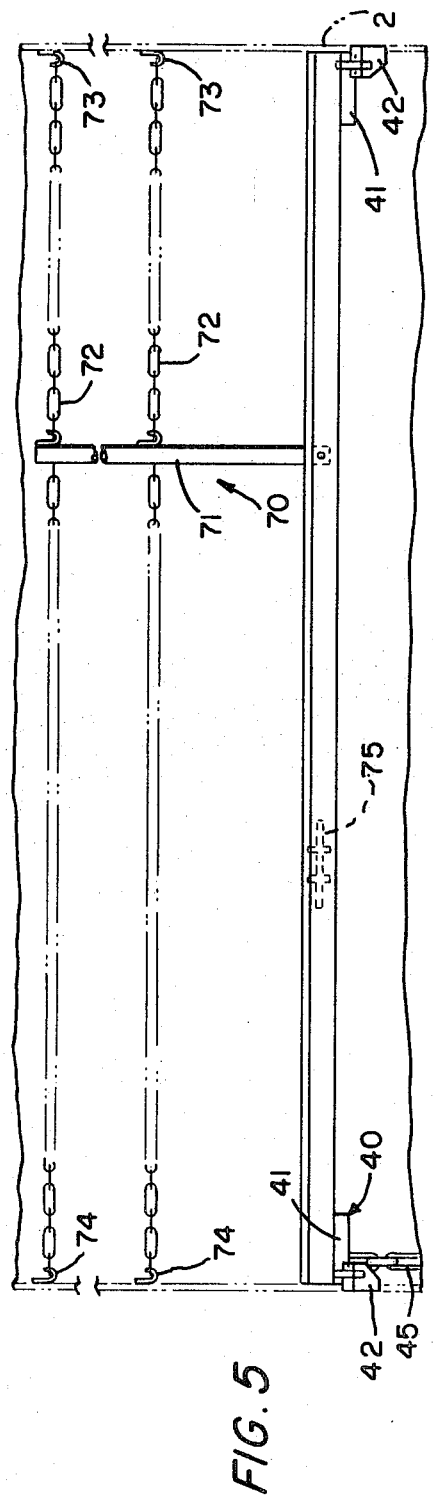
FIG. 5 is an elevational view of one of the platforms of the present invention.

Referring to the drawings and in particular to FIG. 1, there is shown a gas-solids separator generally indicated at 1. The gas-solids separator 1 is a conventional baghouse in that it employs vertically oriented tubular filter bags for removing particulate matter and other pollutants from gases. The baghouse 1 includes a housing 2 having a tube sheet 3 mounted therein and dividing the housing into an upper chamber 5 and a lower chamber 6. The tube sheet 3 includes a plurality of openings 8 therethrough.

A conduit 10 is connected to the lower chamber 6 for supplying dirty gas to be filtered to that chamber. The lower chamber 6 serves as a hopper for collected dust. A screw conveyor 12 is provided in the bottom of the chamber 6 to convey collected particulate matter from the lower chamber or hopper 6 to a disposal point. The upper chamber 5 includes an opening 14 for discharging cleaned gas to atmosphere from the upper chamber 5 and housing 2.

A plurality of generally, vertically oriented elongated tubular fabric filter elements or bags 15 are mounted in the upper chamber 5. The filter elements 15 are connected at their lower end to the tube 16 which forms part of the tube sheet 3 by means of a suitable clamp (not shown). The upper end of the filter elements are connected to a generally horizontal bar 18 by means of suitable clamps 20, such as those shown in U.S. Pat. No. 3,097,939. The bars 18 form part of a conventional shaker mechanism generally indicated at 22 used for cleaning the filter elements 15.

In operation, gas to be filtered enters the lower chamber 6 through the conduit 10, and passes through the openings 8 in the tube sheet 3 into the inside of the filter elements 15. The gas then passes through the fabric filter elements 15. Particulates contained in the dirty gas are collected on the inner surface of the filter elements 15. Cleaned gas then passes into the upper chamber 5 and is exhausted from the housing 2 through the passage 14. Periodically, it is necessary to remove the collected particulates from the filter elements 15. The shaker mechanism 22 oscillates the bar 18 in a well-known manner to gently shake the filter elements 15. This shaking causes the particulates collected on the inside of the filter elements to drop through the openings 8 into the hopper defined by the lower chamber 6. The continuously rotating screw conveyor 12 conveys the particulates to a disposal point.

By the present invention, the openings 8 and filter elements 15 are arranged to define walkways 25 and 26 along the tube sheet 3. In addition, the grouping of the filter elements defines an area 27 around a door 28 in the housing 2. The walkways 25 and 26 and area 27 are such that when it is required to change a filter bag, a maintenance person may walk along the walkways 25 and 26 and have ready access to each of the filter elements 15. Thus, with the walkways 25 and 26, the maintenance person can easily reach the means holding the bottom of the filter bag to the tube sheet 3. In the arrangement shown, the maintenance person will have a maximum reach of four filter bags.

In order to change a filter bag, the maintenance person must also have access to the top of the filter bag. Prior to the present invention, with large factory-assembled dust collectors, this access was achieved by using portable ladders along walkways such as walkways 25 and 26. By the present invention, elevated platforms have been provided to permit ready access to the top of the filter elements.

A pair of platforms 30 and 31 are mounted in the upper chamber 5 above the tube sheet 3 parallel to the walkways 25 and 26. These platforms 30 and 31 are pivotally mounted in the housing so that they swing about their own longitudinal axis. The platforms 30 and 31 each include a working surface 32 and toeboards 34 along their lengths. The inside toeboards terminate short of the end of the platform on the inside of the platform as shown a 35 and 36. This permits a person to step onto the working surface 32 without stepping over the toeboard 34. Each platform 30 and 31 is pivotally connected to the inside of the housing by a pivot means 40 located at each end of the platform. Each pivot means 40 includes a pin 41 secured as by welding to the platform along the longitudinal axis of the platform. A yoke 42 is secured as by welding to the housing 2. The pin 41 rides in the yoke 42 so that the platform will pivot between a position in which the platform can be used as shown in FIGS. 1 and 2 and a nonoperative position shown in FIG. 3.

Means are provided for pivoting the platforms 30 and 31. A chain 45 is connected at one end to each platform on one side of the pivot means 40. The chain hangs down towards the tube sheet 3 far enough so that it can be reached by the maintenance person standing on the tube sheet 3. A hook 46 is provided for use when the platform is in the position of FIG. 3. A latching mechanism 47 is provided for holding the chain 45 down when the platform is pivoted to the operative position of FIG. 1.

Figure 6:
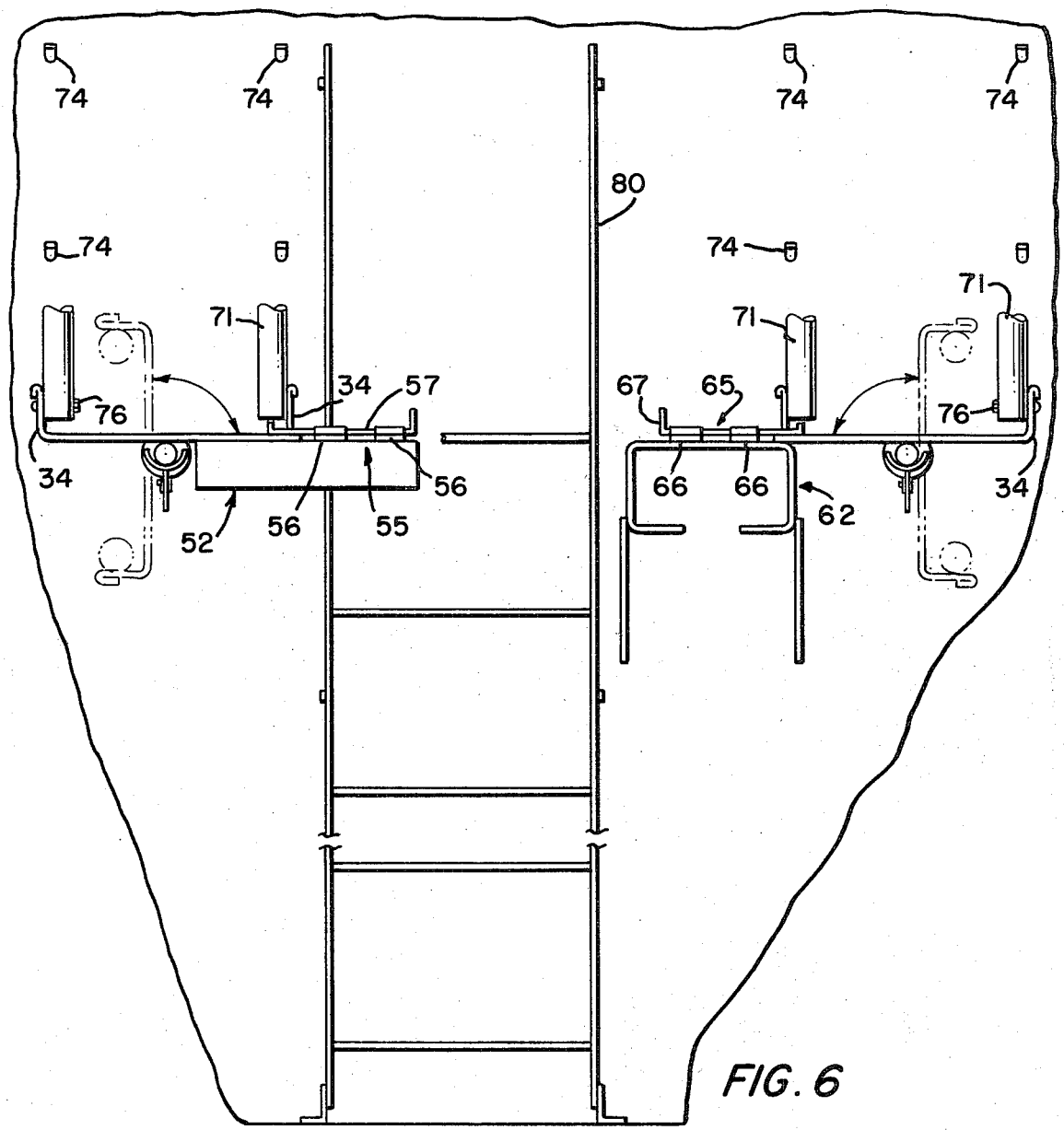
FIG. 6 is an end view taken on the line 6—6 of FIG. 4 showing the elevated platforms of the present invention.

Means are provided for supporting the platforms 30 and 31 when they are in the operative position of FIG. 1. The platform 30 is supported at one end by means of a support 50 secured as by welding to the inside of the housing 2. At the other end of the housing, a support 52 is secured to the inside of the housing for supporting the other end of the platform 30. A latch means 55 is mounted on the support 52 for holding the platform 30 in its operative position. The latch means 55 includes a pair of straps 56 and a latch bar 57 slideable relative to the support 52 and straps 56 over the edge of the platform 30 as shown in FIGS. 4 and 6. Thus, in the operative position shown in FIG. 1, the platform 30 rests on supports 50 and 52 and is prevented from rotating about its own axis by the chain 45 being fixed by latch 47 and by latch means 55.

The platform 31 is supported at one end by a support 60 which is substantially identical to the support 50 for the platform 30. The other end of the platform 31 is supported in its operative position by means of a step and support 62 which is secured as by welding to the housing 2. A latch means 65 similar to latch means 55 and including straps 66 and latch bar 67 is mounted on step 62. The latch bar 67 is slideable between a position in which the bar 67 covers the edge of platform 31 as shown in FIGS. 4 and 6 and a position which permits the platform to pivot. Thus, in the operative position of FIG. 1, the platform 31 rests on support 60 and step 62 and is prevented from rotating by the chain 45 being fixed by latch 47 and by latch means 65.

Each platform 30 and 31 is provided with a guard rail generally indicated at 70. This guard rail consists of a pipe 71 pivotally connected by means of a pivot pin 76 to each toeboard 34, and a pair of chains 72 which extend between hooks 73 and 74 on opposite ends of the housing 2. These chains 72 are also connected to the pipe 71. The guard rail 70 is such that when the platforms 30 and 31 are not being used, the chains 72 can be unhooked from the hooks 73 and 74, laid on the platform and the pipes 71 pivoted to the position shown in FIG. 3. A latch means 75 secures the pipe 71 in the down position of FIG. 3.

A ladder 80 is secured to the inside of the housing 2 and extends from the tube sheet 3 to the platforms 30 and 31. In the embodiment shown, the ladder is positioned so that a person can step directly onto platform 30 or onto step 62 and then onto platform 31.

From the foregoing, it should be apparent how the platforms 30 and 31 are used. The position of the platforms during gas filtering operations is shown in FIG. 3 and in phantom in FIG. 6. When it is desired to do maintenance work on the upper end of the filter bags, the maintenance man releases chains 45 from hooks 46, pulls on the chains 45 to pivot the platforms 30 and 31 to the position shown in FIGS. 1 and 6. The chain is then latched by means of the latch 47 to prevent the platform from accidentally pivoting. The maintenance man then proceeds up ladder 80 and moves latch bar 57 over the edge of platform 30 and latch bar 67 over the edge of platform 31 to further secure the platforms in the working position. The maintenance man can use the step 62 to gain access to platform 31 or can step directly onto the platform 30. Once on the platform, the maintenance man can move latch means 75 to release pipe 71 to raise the guard rail. The chains 72 are hooked onto hooks 73 and 74. The maintenance man can then proceed to the desired work such as changing filter bags 15. When the man has finished his work, he unhooks chains 72 and folds down and latches pipes 71 to remove the guard rail. The maintenance man will then proceed to the ladder 80 and position latch bars 57 and 67 so that the platforms 30 and 31 can be pivoted. Once on the tube sheet 3, the chains 45 can be released so that the platforms 30 and 31 pivot to the position shown in FIG. 3 and in phantom, FIG. 6. The platforms can be weighted so that they will return by themselves to the position shown in FIG. 3, or the operator can pivot them to this position by reclimbing the ladder. In the operative position, the filter bags will not contact the platforms 30 and 31 and not wear due to such contact.

Figure 8:
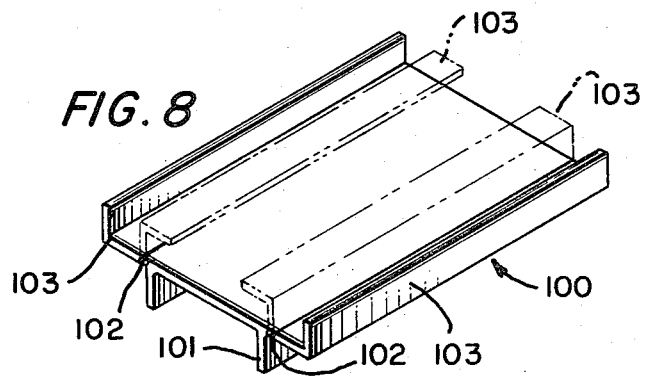
FIG. 8 is a perspective view of a modified platform.

In the modification of FIG. 8, there are shown platforms 100 which can be made up of a channel member 10 having a hinge 102 secured to each edge as shown. An angle member 103 is also secured to each hinge 102. The angle member 103 can be swung to the position shown in phantom in FIG. 8 during normal filtering operations so that the platform is narrow and the filter bags 15 do not contact it. When it is necessary to service the filters 15, the angles 103 can be swung at and secured by latch means (not shown) to increase the horizontal width of the platform.

It should be apparent from the foregoing that the objects of the invention have been carried out. The elevated platforms can be wider than the distance between filter bags. For example, the distance between filter bags across aisle 26 might be twelve inches. However, a twelve-inch elevated work surface, such as platforms 30 and 31, may not conform with established safety practices. However, with the present invention, the platforms 30 and 31 and 100 may be eighteen inches wide to conform with safety standards. When the baghouse is in use, there will be no contact between the filter elements and the elevated platforms because the platforms are pivoted so that they only require width slightly more than the height of the toe-boards 34, say 4 inches. When maintenance work is done on the baghouse, dirty gas is not being filtered so contact between the platform and the filter elements will not increase wear on the filter elements. It should therefore be obvious that with the present invention, a maximum number of filter bags can be placed within the fixed volume of the baghouse yet the advantages of a permanent, elevated platform are retained.

It is intended that the foregoing description be merely that of a preferred embodiment and that the invention be limited solely by that which is within the scope of the appended claims.

We claim:

1. In a gas-solids separator for filtering gases including a housing, a tube sheet mounted in and dividing said housing into an upper and lower chamber and having a plurality of openings therein; a plurality of elongated filters mounted in rows in one of said chambers, means for securing one end of each of said filter to said tube sheet so that each is flow connected to one of said openings whereby communication between said chambers is solely through said openings and said filters when the separator is filtering gases; means for supporting the other end of said filters in said one of said chambers, means for supplying gas to be filtered to one of said chambers and means for exhausting filtered gas from the other of said chambers; means for permitting access to the means for supporting the other end of said filters comprising: at least one platform pivotally mounted in said housing between adjacent rows of filters; said platform being dimensioned to be wider than the distance between adjacent rows of the filters, and means operatively connected to said platform for changing the position of said platform from a first non-operating position to a second operating position including means for pivoting said platform about its own longitudinal axis parallel to the axis of said rows when it is desired to gain access to the means for supporting the other end of the filters.

2. In a gas-solids separator according to claim 1, said means for permitting access further comprising means for securing said platform in the operative position.

3. In a gas-solids separator according to claim 2, said means for permitting access further comprising ladder means extending from said tube sheet to said platform.

4. In a gas-solids separator according to claim 3, said means for pivoting said platform being operable from a position accessible to an operator standing on said tube sheet.

5. In a gas-solids separator according to claim 4, said means for permitting access further comprising guard rails pivotally connected to said platform.

6. A gas-solids separator comprising: a housing; a tube sheet dividing said housing into an upper chamber and a lower chamber and having a plurality of openings therethrough; a plurality of elongated, generally vertically extending filter elements mounted in said upper chamber; the lower end of each filter element flow connected to one of the openings in said tube sheet whereby the sole communication between said lower chamber and said upper chamber is through said openings and said filter elements; means for supporting the upper end of said filter elements; said openings in said tube sheet and said filter elements being grouped to define at least one walkway along said tube sheet to permit access to the lower end of said filter elements; means for permitting access to the upper end of said filter elements including at least one platform means mounted in said housing above said tube sheet and means operatively connected to said platform means for changing the position of said platform means including means for pivoting said platform about its own longitudinal axis parallel to the axis of said group when it is desired to gain access to the upper end of said filter elements said platform means being dimensioned to be wider from said longituidnal axis to its edge than the distance from said longitudinal axis to the group of filter elements adjacent said edge.

7. A gas-solids separator according to claim 6 wherein said platform means is parallel to the walkway along said tube sheet and is adapted to be pivoted between a position which permits said platform means to be used by an operator and a position which prevents said filter elements from contacting said platform means and said means for permitting access to the upper end of said filter elements further includes means for latching said platform means in a position which permits use by an operator.

8. A gas-solids separator according to claim 7 wherein said means for permitting access to the upper end of said filter elements further includes guard rails pivotally mounted on said platform means.

9. A gas-solids separator according to claim 8 wherein said means for permitting access to the upper end of said filter elements further includes ladder means extending from said tube sheet to said platform means.

* * * * *